United States Patent [19]

Kikuta et al.

[11] 4,363,901

[45] * Dec. 14, 1982

[54] PROCESS FOR PRODUCING α-OLEFIN POLYMERS

[75] Inventors: Kazutsune Kikuta; Masami Tachibana, both of Ichiharashi; Akihiro Sato, Chibaken, all of Japan

[73] Assignee: Chisso Corporation, Tokyo, Japan

[*] Notice: The portion of the term of this patent subsequent to Sep. 1, 1998, has been disclaimed.

[21] Appl. No.: 233,778

[22] Filed: Feb. 12, 1981

[30] Foreign Application Priority Data

Feb. 15, 1980 [JP] Japan ................................. 55/17249

[51] Int. Cl.$^3$ ......................... C08F 4/02; C08F 10/00
[52] U.S. Cl. ................................. 526/97; 252/429 B; 526/114; 526/115; 526/116; 526/119; 526/121; 526/122; 526/124; 526/125; 526/65; 526/348; 526/348.6; 526/351; 526/901; 526/902
[58] Field of Search ............... 526/114, 115, 116, 119, 526/97, 124, 125, 121, 122, 65

[56] References Cited

U.S. PATENT DOCUMENTS

| | | | |
|---|---|---|---|
| 4,063,010 | 12/1977 | Marie et al. | 526/157 |
| 4,260,707 | 4/1981 | Sylvester et al. | 526/153 |
| 4,287,328 | 9/1981 | Kikuta et al. | 526/124 |

*Primary Examiner*—Edward J. Smith
*Attorney, Agent, or Firm*—Fred Philpitt

[57] ABSTRACT

A process for producing high-quality α-olefin polymers with a higher yield in a long lasting stabilized manner even in the case of gas phase polymerization is provided. In the production process of α-olefin polymers which comprises reacting a trivalent metal halide with a divalent metal compound to obtain a solid product (I); reacting this product with at least one electron donor (ED) and at least one electron acceptor (EA), once to 10 times, and at that time, using TiCl$_4$ at least once as the (EA) to obtain a solid product (II); combining this product with an organoaluminum compound (OAl) and an (ED) (these three being referred to as catalyst components), the improvement which comprises subjecting a part or the whole of the catalyst components to polymerization treatment with a small amount of an α-olefin, at least in the coexistence of the solid product (II) and (OAl), in the combination of the catalyst components to obtain a preactivated catalyst, and subjecting α-olefin(s) to gas phase polymerization or bulk or slurry polymerization followed by gas phase polymerization, using the catalyst.

10 Claims, No Drawings

PROCESS FOR PRODUCING α-OLEFIN POLYMERS

BACKGROUND OF THE INVENTION

1. Field of the Invention

This invention relates to production of α-olefin polymers, and more particularly it relates to a process for producing highly crystalline α-olefin polymers having a good particle form, with a high yield, by the use of a preliminarily activated catalyst which is suitable for polymerization of α-olefins, particularly gas phase polymerization, and further, as a modification of gas phase polymerization, a combination of gas phase polymerization with slurry or bulk polymerization.

2. Description of the Prior Art

The inventors of the present application have developed processes for polymerizing ethylene or α-olefins containing ethylene, by the use of catalysts comprising a combination of an organoaluminum, etc. with a solid product (which will be hereinafter referred to as solid catalyst component) obtained by having a transition metal compound supported on a solid product (I) obtained by reacting a trivalent metal halide with a divalent metal compound, in the following various reaction manners.

For examples, the following processes have been proposed:

(1) a process wherein a transition metal compound is reacted with the above-mentioned solid product (I) in the presence of an aromatic compound (Japanese patent publication Nos. 13,609/1972 and 16,782/1974);

(2) a process wherein the above-mentioned solid product (I) is reacted with a polysiloxane or an electron donor, and thereafter with a transition metal compound (Japanese patent publication No. 13,827/1977; Japanese patent application laid-open No. 61,283/1979);

(3) a process wherein a polysiloxane or an electron donor and a transition metal compound are added at the same time or a complex of them is added to the above-mentioned solid product (I), to effect reaction (Japanese patent application laid-open Nos. 116,078/1979, 113,687/1979 and 124,091/1979);

(4) a process wherein either one or both of at least one kind of electron donors and at least one kind of electron acceptors are reacted with the above-mentioned solid product (I), in a plurality of divided portions (Japanese patent application No. 101,960/1978);

(5) a process wherein at least one kind of electron donors and at least one kind of electron acceptors are reacted with the above-mentioned solid product (I), and at that time, TiCl₄ is employed as an electron acceptor at least once, and further the resulting solid catalyst component, an organoaluminum compound and an electron donor are combined together (Japanese patent application No. 106,797/1978);

(6) a process wherein various additives such as titanium alkoxides, silicone oils, polyethylene glycol dialkyl ethers, other electron donors, etc. are added at the time of polymerization (Japanese patent publication Nos. 13,609/1972, 13,772/1972). The inventions of these processes (1) to (6) will be hereinafter referred to as prior inventions.

In case where these prior inventions are applied to slurry polymerization or bulk polymerization, various advantages are brought about such that polymer yield per unit weight of catalyst component is very high; crystallinity of polymers of α-olefins such as propylene is high; particle form of polymers is good, particularly in the case of the inventions of the processes (5) to (6), it is possible to control the molecular weight distribution into a narrower range; etc.

On the other hand, gas phase polymerization has advantages in that, recovery and reuse of solvents employed for polymerization as in the case of slurry polymerization process are unnecessary, and recovery and reuse of liquefied monomers e.g. liquified propylene as in the case of bulk polymerization process are also not carried out; hence the cost for solvent or monomer recovery is slight and it is possible to simplify the apparatus for producing α-olefin polymers. However, gas phase polymerization process has disadvantages in that since the monomer inside the polymerization vessel is present in gas phase, the monomer concentration is lower than those in the cases of slurry polymerization process and bulk polymerization process; hence the reaction rate is lower and the polymer yield per unit amount of catalyst is insufficient, and since the retention time is to be extended to increase the yield, as enlarged reaction must be used or since such a component as trialkylaluminum is employed in an excess amount for elevating the catalyst activity, the stereoregularity is thereby reduced. Gas phase polymerization process also has disadvantages in that since the catalyst particles are not uniform, the resulting polymer particles are also not uniform; during the polymerization, oligomerization occurs, polymer particles agglomerate, and the removal of polymerization heat is so insufficient that the polymer particles become more agglomerative and massive, which brings about clogging of the port through which the polymer particles are discharged out of the polymerization vessel, or clogging of the succeeding transportation line which in turn makes it difficult to carry out a long lasting stabilized continuous operation; and as to the quality of the polymer particles, these particles are rough and have a considerable dispersion in the quality due to the inferior dispersion of stabilizer as well as the considerable dispersion in the physical properties between the polymer particles.

The object of the present invention is to provide a process for producing high-quality α-olefin polymers with a higher yield in a long lasting stabilized manner even when the process is relied on gas phase polymerization process where the monomer concentration is relatively low.

SUMMARY OF THE INVENTION

The present invention resides in the following process:

In a process for producing α-olefin polymers which comprises:

reacting a trivalent metal halide with a hydroxide, oxide or carbonate of divalent metals or a composite salt containing the foregoing compounds or a hydrate of divalent metal-containing compounds (these latter compounds being hereinafter referred to as divalent metal compounds) to obtain a solid product (I);

reacting this solid product (I) with at least one kind of electron donors and at least one kind of electron acceptors, at least once and at most 10 times, and at that time, employing titanium tetrachloride at least once as said at least one kind of electron acceptors, to obtain a solid product (II);

combining this solid product (II) with an organoaluminum compound and an electron donor (these three substances to be combined together being hereinafter referred to as catalyst components), the improvement which comprises:

subjecting a part or the whole of the above-mentioned catalyst components to a polymerization treatment with an α-olefin (preferably in a small amount), at least in the coexistence of the above-mentioned solid product (II) and organoaluminum compound, when the catalyst components are combined together, to obtain a preliminarily activated catalyst (abbreviated hereinafter to "preactivated catalyst"), and subjecting an α-olefin or olefins to gas phase polymerization, bulk polymerization followed by gas phase polymerization or slurry polymerization followed by gas phase polymerization, in the presence of the preactivated catalyst obtained above.

DETAILED DESCRIPTION OF THE PREFERRED EMBODIMENTS

The components constituting the catalyst employed in the process of the present invention are as follows:
(A) Trivalent metal halide
(B) Divalent metal compound (hydroxide, oxide or carbonate or divalent metals or composite salt containing the foregoing compounds or hydrate containing divalent metal(s)).
(ED) Electron donor
(EA) Electron acceptor
(OAl) Organoaluminum compound (α-O) α-Olefin Preparation of the catalyst employed in the present invention will be described below.

The solid product (I) is obtained by reacting a trivalent metal halide with a divalent metal compound.

As for the trivalent metal compound (A), aluminum trichloride (anhydrous), aluminum tribromide (anhydrous), ferric chloride (anhydrous), etc. are employed.

As for the divalent metal compound (B), for example, hydroxides such as $Mg(OH)_2$, $Ca(OH)_2$, $Zn(OH)_2$, $Mn(OH)_2$, oxides such as MgO, CaO, ZnO, MnO, composite oxides containing divalent metal(s) such as $MgAl_2O_4$, $Mg_2SiO_4$, $Mg_6MnO_8$, carbonates such as $MgCO_3$, $MnCO_3$, composite carbonates containing carbonates of divalent metals such as $MgCO_3.CaCO_3$, halogenated hydrates such as $SnCl_2.2H_2O$, $MgCl_2.nH_2O$ (n=1~6), $NiCl_2.6H_2O$, $MnCl_2.4H_2O$, $KMgCl_3.6H_2O$, hydrates of composite compounds consisting of a halide and a hydroxide of divalent metals such as $MgCl_2.nMg(OH)_2.mH_2O$ (n=1~3, m=1~6), hydrates of composite oxides such as $3MgO.2SiO_2.2H_2O$, hydrates of composite compounds consisting of a carbonate and a hydroxide of divalent metals such as $3MgCO_3.Mg(OH)_2.3H_2O$, hydrates of hydroxide carbonate containing divalent metals such as $Mg_6Al_2(OH)_{16}CO_3.4H_2O$, etc. are mentioned. Among them, divalent metal compounds containing magnesium are particularly preferable.

As for the preparation of the solid product (I), (1) a method of reacting a trivalent metal halide (A) with a divalent metal compound (B), while milling them together in a mill such as ball mill, vibration mill, etc., (2) a method of milling and mixing (A) and (B) together and thereafter reacting them by heating, and the like method are illustrated. As for the ratio of amounts of (A) and (B), 0.1 to 10 mols of the divalent metal compound (B) per one mol of the trivalent metal halide (A) are sufficient. In the case of reaction with milling, as for the milling reaction conditions, room temperature (−20° C.) to 500° C., 5 to 100 hours in the case of ball mill and 10 minutes to 50 hours in the case of vibration mill, are sufficient. Further, in the case of milling and subsequent heating with stirring, (A) and (B) are milled for 5 to 100 hours in the case of ball mill and 10 minutes to 50 hours in the case of vibration mill, and thereafter heated at room temperature (20° C.) to 500° C. for 10 minutes to 50 hours. The solid thus obtained is referred to as solid product (I).

This solid product (I) is then reacted with at least one kind of electron donors (ED) and at least one kind of electron acceptors (EA).

As for the electron donors (ED) employed in the present invention, organic compounds containing at least one atom of oxygen, nitrogen, sulfur and phosphorus are mentioned.

The examples of the electron donors are esters (RCOOR') wherein R and R' each represent a hydrocarbon group such as alkyl group, aryl group (this definition applies to the following R and R'), alcohols (ROH), ethers (R-O-R'), aldehydes (RCHO), fatty acids (RCOOH), ketones (RCOR'), nitriles (RCN), amines $R_nNH_{3-n}$ (wherein n=1, 2 or 3), amides, ureas, isocyanates (RNCO), azo compounds (R-N=N-R'), phosphines $(R_nPR'_{3-n}$ (wherein n=1, 2 or 3)), phosphites $(P(OR)_3)$, phosphinites $(RP(OR')_2)$, thioethers $(R_nSR'_{2-n}$ (wherein n=1 or 2)), thioalcohols (RSH), etc. Further, polysiloxanes can be also employed. Among these electron donors, esters, alcohols, ethers, ketones, phosphines and polysiloxanes are preferable, and esters are most preferable. As for concrete examples of electron donors, alcohols such as methanol, ethanol, propanol, butanol, pentanol, hexanol, octanol, phenol, cresol, xylenol, ethylphenol, naphthol; ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran; esters such as methyl methacrylate, ethyl acetate, butyl formate, amyl acetate, vinyl lactate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; fatty acids such as formic acid, acetic acid, propionic acid, lactic acid, oxalic acid, succinic acid, acrylic acid, maleic acid; aromatic acids such as benzoic acid; ketones such as methyl ethyl ketone, methyl isobutyl ketone, benzophenone; nitriles such as acetonitrile; amines such as methylamine, diethylamine, tributylamine, triethanolamine, β(N,N-dimethylamino) ethanol, pyridine, quinoline, α-picoline, N,N,N',N'-tetramethyl-hexaethylenediamine, aniline, dimethylaniline; amides such as formamide, hexamethyl phosphoric acid triamide, N,N,N',N',N''-pentamethyl-N'-β-dimethylaminoethyl phosphoric acid triamide, octamethylpyrophosphoroamide; ureas such as N,N,N',N'-tetramethylurea; isocyanates such as phenylisocyanate, toluylisocyanate; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n- butylphosphite, triphenylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; and thioalcohols such as ethyl thioalcohol, n-propyl thioalcohol, thiophenol, are mentioned.

The polysiloxanes are chain or cyclic siloxane polymers expressed by the general formula

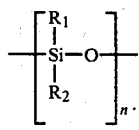

(wherein n represents 3–10,000), and $R_1$ and $R_2$ represent the same or different kinds of substituents capable of being combined to Si, and above all, those consisting of one kind of hydrogen, hydrocarbon residual group such as alkyl group, aryl group, etc., halogen, alkoxy group, aryloxy group, fatty acid residual group, etc., or those in which two kinds or more of the above-mentioned radicals or groups are distributed and combined in a molecule in various proportions may be employed.

Polysiloxanes commonly employed are those wherein each R in the above-mentioned formula is a hydrocarbon residual group, and as concrete examples, alkylsiloxane polymers such as lower polymers e.g. octamethyltrisiloxane, octaethylcyclotetrasiloxane and polymers e.g. dimethylpolysiloxane, ethylpolycyclosiloxane, methylethylpolysiloxane etc., further arylsiloxane polymers such as hexaphenylcyclotrisiloxane, diphenylpolysiloxane, and further alkylarylsiloxane polymers such as diphenyloctamethyltetrasilaxane, methylphenylpolysiloxane, etc. are illustrated.

Besides, those wherein $R_1$ is hydrogen or halogen and $R_2$ is a hydrocarbon residual group such as alkyl group, aryl group, etc., e.g. alkylhydrogensiloxane polymers, haloalkylsiloxane polymers, haloarylsiloxane polymers, etc. are illustrated. Further, polysiloxanes wherein each R is alkoxy or aryloxy group or fatty acid residual group can be also employed.

The viscosity of polysiloxanes employed is suitably in the range of 10–10,000 centistokes, preferably 10–2,000 centistokes, at 25° C.

These electron donors (ED) may be also employed in admixture.

As for the electron acceptors (EA), halides of elements of III group to VIII group of the Periodic Table are mentioned. For Example, ($EA_1$) aluminum chloride compounds expressed by the general formula $R_nAlCl_{3-n}$ (wherein $0 \leq n < 3$; R represents a hydrocarbon group of 1 to 20C, preferably 1 to 10), and concretely, $AlCl_3$ (anhydrous), $EtAlCl_2$, n-$PrAlCl_2$, n-$BuAlCl_2$, i-$BuAlCl_2$, $Et_{1.5}AlCl_{1.5}$ (ethylaluminum sesquichloride), $Et_2AlCl$, n-$Pr_2AlCl$, i-$Bu_2AlCl$ (Et, Pr and Bu represent ethyl, propyl and butyl, respectively, in the above-mentioned formulas), are mentioned. Besides, ($EA_2$) inorganic halides such as $SiCl_4$, $SnCl_2$, $TiCl_4$, $ZrCl_4$, $PCl_3$, $PCl_5$, $VCl_4$, $SbCl_5$, $SCl_2$, $MnCl_2$, $FeCl_2$, $NiCl_2$ are mentioned.

In the reaction of the electron donor (ED) and the electron acceptor (EA) with the solid product (I), a solvent may be employed. Further, in the case of washing or the like after the reaction, a solvent may be also employed. As such a solvent, aliphatic hydrocarbons such as n-pentane, n-hexane, n-heptane, n-octane, i-octane, n-nonane, n-decane, etc.; aromatic hydrocarbons such as benzene, toluene, xylene, ethylbenzene, cumene, etc.; and halogenated hydrocarbons such as carbon tetrachloride, chloroform, dichloroethane, trichloroethylene, tetrachloroethylene, carbon tetrabromide, chlorobenzene, orthodichlorobenzene, etc. (these will be hereinafter referred to merely as solvent) may be employed.

As the process for reacting the solid product (I) with at least one kind of electron donors (ED) and at least one kind of electron acceptors (EA), at least once and at most 10 times, and at that time, employing titanium tetrachloride at least once as said at least one kind of electron acceptors, the following various manners may be employed.

As for the reaction state, the reaction may be carried out in suspension state in the presence or absence of solvent (such reaction will be hereinafter referred to as suspension reaction), or may be carried out under milling with a milling means such as vibration mill, ball mill, etc. (such reaction will be hereinafter referred to as milling reaction), or may be carried out in a combination of suspension reaction with milling reaction (the reaction referred to in the following description includes both of suspension reaction and milling reaction).

When two or more kinds of electron donors (ED) are employed, they may be mixed together and employed, but when the reaction is carried out twice or more employing (ED), two or more kinds of (ED) may be employed either in admixture or separately.

In the present invention, $TiCl_4$ is necessarily employed as (EA), (EA) or (EA)s other than $TiCl_4$ are employed when a plurality of (EA)s are employed. When a plurality of kinds of (EA)s are employed, there may be employed in admixture, and when the reaction employing (EA) is carried out twice or more, the plurality of kinds of (EA)s may be employed either in admixture or separately. Either in the case of only once or in the case of twice or more, $TiCl_4$ is employed necessarily once. In such case, it is preferable to employ $TiCl_4$ alone as the (EA), but a mixture of $TiCl_4$ with other electron acceptors in a mixing proportion of $TiCl_4$ of 20% by weight or more may be also employed. When $TiCl_4$ as (EA) is referred to in the following description of the reaction employing (EA), it includes also the above-mentioned mixture besides $TiCl_4$, alone.

Further, various orders of addition or reaction of the above three substances to be reacted may be illustrated. Representative examples thereof are as follows:

(1) A process wherein (ED) and (EA) are each reacted once with the solid product (I). This process further has the following manners: (1-1) a manner wherein the three of the solid product (I), (ED) and (EA) are added in an optional order, followed by reaction; (1-2) a manner wherein a reaction product of (ED) with (EA) is reacted with the solid product (I); and (1-3) a manner wherein (ED) is reacted with the solid product (I), followed by reaction with (EA).

(2) A process wherein when (ED) and (EA) are reacted with the solid product (I), either one or both of (ED) and (EA) are reacted twice or more and $TiCl_4$ is reacted at least once as an (EA). This process further has the following manners: (2-1) a manner wherein (ED) is reacted with the solid product (I), and thereafter (EA) is reacted twice or more; (2-2) a manner wherein an electron donor of a first kind ($ED_1$) is reacted with the solid product (I), and thereafter an electron donor of a second kind (ED$_2$) and (EA) are reacted according to the process (1); (2-3) a manner wherein an electron acceptor of a first kind (EA$_1$) is reacted with the solid product (I), and thereafter (ED) and an electron acceptor of a second kind (EA$_2$) are reacted; (2-4) a manner wherein (ED) and (EA$_1$) are reacted with the solid product (I) according to the process (1), and thereafter (EA$_2$) is reacted at least once; (2-5) a manner wherein the solid product (I) is reacted with (ED$_1$) and (ED$_2$) in the coexistence thereof or with (ED$_1$) and then with (ED$_2$), and thereafter (EA$_1$) is reacted, after which (EA$_2$) is reacted at least once; (2–6) a manner wherein (ED$_1$) is reacted with the solid product (I) and thereafter (ED$_2$) is reacted, after which an electron donor of a third kind (ED$_3$) and (EA) are reacted according to the process (1); and (2–7) a manner wherein (ED$_1$) and (EA$_1$) are reacted with the solid product (I) according to the process (1) and thereafter (ED$_2$) and (EA$_2$) are reacted according to the process (1).

The above-mentioned terms "reacted--, and thereafter" or "reacted twice or more" employed in the description of these manners refer to a once section in the reaction operations, which makes it a principle to carry out an operation of removing unreacted substances and unnecessary products after completion of the reaction (or after each reaction in the case of twice or more reactions). As for the removing operation, the most part of the substances to be removed is in itself in the form of liquid or soluble in solvents and when solvents are employed for the reaction, a liquid phase is formed; hence the moving operation is carried out by decantation, filtration or dry-up or by adding a solvent, followed by employing the above operations. Such a removal of unreacted substances and unnecessary substances is not necessary to be strict. Thus, in case where the amount of (ED) or (EA) employed in the reaction is small and the amount of unreacted substances and unnecessary products is nearly zero or slight, the removing operation may be omitted and the succeeding reaction may follow. In the manner (1-2), the reaction product of (ED) with (EA) is obtained by mixing (ED) with (EA), and in this case, the solid product (I) may be added to the reaction product still containing unnecessary substances, etc. as it is.

In the description of the above-mentioned manners, (ED$_1$), (ED$_2$), (EA$_1$), (EA$_2$), etc. represent different kinds of electron donors or electron acceptors, as described above, and these symbols themselves express not only a single compound but a mixture of two or more kinds of single compounds, respectively. When (EA$_1$), (EA$_2$), etc. as two or more kinds of electron acceptors are employed, at least one of them must be TiCl$_4$.

Further, as to the reaction times of (ED) or (EA), either in case where the same kind is repeatedly employed, or in case where different kinds are employed, the reaction times are at most 10 times, preferably at most 5 times. Even if the reactions are carried out more than 10 times, the effectiveness is not enhanced so much accordingly.

In the reaction of electron donor (ED) and electron acceptor (EA) with the solid product (I), the amounts of (ED), (EA) and solvent employed are preferably in the ranges of 1 to 5,000 g of (ED), 1 to 5,000 g of (EA) and 0 to 5,000 ml of solvent, based on 100 g of the solid product (I) each one time reaction.

As for the reaction conditions for the respective reaction steps, the reaction temperature is in the range of 0° to 500° C., preferably 20° to 200° C., and the reaction time has suitable ranges depending on the reaction state, that is, a range of one minute to 10 hours in the case of reaction in suspension state, and a range of 5 to 200 hours in the case of milling reaction with ball mill, while a range of 10 minutes to 50 hours in the case of milling reaction with vibration mill. The reaction product of (ED) with (EA) in the manner (2-1) is obtained by mixing the both together at a temperature of room one to 150° C. and over one minute or longer.

Among the above-mentioned reaction manners, (2-1), (2-4) and (2-5) are particularly preferable. In the manners (2-4) and (2-5), a case where SiCl$_4$ is employed as (EA$_1$) and TiCl$_4$ is employed as (EA$_2$) is most preferable, and as for the reaction state in carrying out this manner, milling reaction is preferable for reacting SiCl$_4$ (EA$_1$) (together with (ED) in the case of the manner (2-4) and singly in the case of the manner (2-5)), while suspension reaction is preferable for reacting TiCl$_4$ (EA$_2$). For the reaction times of (EA$_2$), once or twice is most effective.

The solid product obtained as above is a solid product (II).

The solid product (II) obtained as mentioned above is taken out from the reaction liquid, after completion of its formation reaction, by removing unreacted (ED) and (EA) from the reaction liquid by means of distilling off them under reduced pressure or the atmospheric pressure, or filtration or decantation or washing with solvent, followed by drying, and the product is then employed for the subsequent reaction. Alternatively, a solvent is added to the reaction liquid after said washing to form a suspension, which is then, as it is, employed for the subsequent reaction.

The solid product (II) is then combined with an organoaluminum compound (OAl) and an electron donor (ED) to form a catalyst component, and in this case a part or the whole of this catalyst component is subjected to a polymerization treatment with an α-olefin, at least in the coexistence of the solid product (II) and (OAl), to form a preactivated catalyst, which is then employed as a catalyst for polymerizing α-olefins. The "polymerization treatment" referred to in the present invention means that a small amount of an α-olefin is contacted with the catalyst component under polymerizable conditions to polymerize the α-olefin. As a result of this polymerization treatment, the catalyst component forms a state where it is coated with the polymer of the α-olefin. When the polymerization treatment is carried out employing the respective total amounts of the respective catalyst components, the catalyst preparation finishes after the polymerization treatment, but when the total amounts are not employed, but the remainders are further added after the polymerization treatment, the catalyst preparation finishes after completion of this addition.

The organoaluminum compounds (OAl) used in this invention include trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc., alkylaluminum dihalides such as ethylaluminum dichloride, i-butylaluminum dichloride; alkylaluminum hydrides such as diethylaluminum hydride, alkylaluminum sesquihalides such as methylaluminum sesquichloride, ethylaluminum sesquichloride. In addition, alkoxyalkylaluminums such as monoethoxydiethylaluminum, diethoxymonoethylaluminum, etc. can also be used.

The electron donors (ED) to be combined with the solid product (II) are the same with those described in the preparation of the solid product (II).

As for α-olefins employed for the preactivation, straight chain monoolefins such as ethylene, propylene, butene-1, hexene-1, heptene-1, octene-1, decene-1, etc., branched chain monoolefins such as 4-methyl-pentene-1, 2-methyl-pentene-1,3-methyl-butene-1, etc. and styrene, etc. are mentioned. These α-olefins may be same as or different from those to be polymerized employing the preliminarily activated catalyst.

The polymerization treatment may be carried out in any one of a hydrocarbon solvent such as propane, butane, n-pentane, n-hexane, n-heptane, n-octane, benzene, toluene, etc., a liquefied α-olefin such as liquefied propylene, liquefied butene-1, etc. and ethylene or propylene gas, and hydrogen may be made coexistent at the time of the treatment.

The amounts of the substances employed in the preactivation and the treating conditions therefor will be described below. The reaction is carried out at a temperature of 0° to 100° C. for a period of one minute to 20 hours, employing 0.1 to 500 g of an organoaluminum (OAl), 0 to 50 l of a solvent, 0.05 to 20 g of (ED), 0 to 1,000 ml of hydrogen and less than 5,000 g, preferably 0.05 to 3,000 g of an α-olefin (α-0), each based on 1 g of the solid product (II), to react the α-olefin in an amount of 0.01 to 2,000 g based on 1 g of the solid product (II). When the ultimate component is added and the reaction is completed, the preactivation finishes. In the preactivation, it is also possible to carry out it in the presence of an α-olefin polymer. Particles of such an α-olefin polymer may be either the same as or different from those of α-olefins to be polymerized, and the amount may be in the range of 0 to 5,000 g based on 1 g of the solid product (II).

After completion of the preactivation, it is possible to remove the solvent employed therein and unreacted α-olefin by distilling off them under reduced pressure or the like means, to obtain a preactivated catalyst in the form of dry powder, or it is also possible after the procedure to obtain a suspension of the solid product (II) in a solvent in an amount not exceeding 80 l based on 1 g of the solid product (II).

In order to obtain the preactivated catalyst from the solid product (II), an organoaluminum (OAl) and an electron donor (ED), by subjecting a part or the whole of the catalyst components to polymerization treatment with an α-olefin at least in the presence of the solid product (II) and the organoaluminum, the following various manners are illustrated:

(1) a manner wherein (OAl), the solid product (II) and (ED) are mixed together and thereafter (α-0) is added for preactivation; (2) a manner wherein the solid product (II), (OAl) and (ED) are added in an optional order in the presence of (α-0); (3) a manner wherein the solid product (II) and (OAl) are mixed together and thereafter (α-0) is added, followed by further adding (ED); (4) a manner wherein the solid product (II), (OAl) and (ED$_1$) are mixed together in an optional order, and thereafter (α-0) is added, followed by further adding (ED$_2$) ((ED$_1$) and (ED$_2$) may be the same or different); and (5) (OAl) and the solid product (II) are mixed together or the solid product (II), (OAl) and (ED$_1$) are added in an optional order, followed by adding an α-olefin of a first kind (α-O$_1$), thereafter further adding (ED$_2$) and again adding an α-olefin of a second olefin (α-O$_2$) ((ED$_1$) and (ED$_2$) and (α-O$_1$) and (α-O$_2$) may be the same or different, respectively). In any of these manners, when the solid product (II), (OAl) and (α-O) have been brought into a coexistent state, polymerization treatment is to be carried out.

When the components of the solid product (II), (ED), (OAl) and (α-O) are mixed or added, agitation is carried out if necessary. In the mixing or addition thereof, the temperature is preferably in the range of room temperature (20° C.) to 100° C., and the time required for the mixing or the addition has no particular limitation, but it may be carried out over several minutes to several hours in total; when the ultimate component has been added, the preparation of the preactivated catalyst finishes. Among the above-mentioned manners, the manners (3) to (5) afford particularly superior results.

The preactivated catalyst prepared as above is employed for producing α-olefin polymers.

The catalyst according to the present invention is particularly suitably employed for gas phase polymerization of α-olefins, and as modifications of gas phase polymerization, slurry polymerization followed by gas phase polymerization or bulk polymerization followed by gas phase polymerization also affords desirable results.

The gas phase polymerization of α-olefins is carried out in the absence of a solvent such as n-hexane, n-heptane, etc., and besides it is also possible to carry out the polymerization in a state where 0 to 500 g of a solvent per 1 kg of an α-olefin polymer is contained. The polymerization may be carried out either continuously or batchwise. Further the polymerization may be carried out either in a fluidized bed manner, in a fluidized manner provided with stirring blade, or under a vertical type or horizontal type paddle agitation.

The above-mentioned slurry polymerization or bulk polymerization followed by gas phase polymerization, as modifications of gas phase polymerization, may be carried out either batchwise or continuously as follows: for example, (1) a manner wherein polymerization in a solvent such as n-hexane (slurry polymerization) or polymerization in a liquefied α-olefin (bulk polymerization) is first carried out and thereafter the solvent or liquefied α-olefin is removed, followed by gas phase polymerization by feeding a gaseous α-olefin; (2) a manner wherein slurry polymerization or bulk polymerization is first carried out and α-olefin polymerization is continued without removing solvent or α-olefin to attain a state where the solvent or α-olefin has been occluded in α-olefin polymer particles and the liquid portion has disappeared; thus, the slurry or bulk polymerization is continuously transferred to gas phase polymerization; (3) α-olefin polymerization is continued till the content of solvent or liquefied α-olefin in polymer particles containing the catalyst reaches 500 g or less based on 1 kg of the polymer particles, and thereafter the α-olefin is fed in gas phase to carry out gas phase polymerization. The combination of slurry or bulk polymerization with gas phase polymerization affords desirable results particularly in the case of continuous polymerization. As an example of such polymerization, slurry or bulk polymerization is carried out in the first stage, and the polymerization is continued till polymer particles contained in the polymerization mixture turn polymer particles containing 30% or less of solvent or liquefied α-olefin, or the solvent or liquefied α-olefin is removed, followed by gas phase polymerization in the second stage by fluidizing the resulting polymer particles. In the gas phase polymerization of the second stage, the catalyst of the former stage is employed as it is, but addition of a fresh catalyst in the second stage does not hinder the effectiveness of the present invention. In this case, it is preferable to carry out the polymerization so that the ultimate polymer may have a proportion by weight of 0.1 to 100 parts of a polymer portion of gas phase polymerization to one part of that of slurry or bulk polymerization.

As for the polymerization conditions, any of slurry polymerization, bulk polymerization and gas phase polymerization may be carried out at a polymerization temperature of room temperature (20° C.) to 200° C., at a polymerization pressure of the atmospheric pressure (0 kg/cm$^2$G) to 50 kg/cm$^2$G and for a polymerization time of 5 minutes to 10 hours. In the polymerization, conventional means such as addition of a suitable amount of hydrogen may be employed for molecular weight control.

As for the α-olefins employed in the process of the present invention, straight chain monoolefins such as ethylene, propylene, butene-1, hexene-1, octene-1, etc., branched chain monoolefins such as 4-methyl-pentene-1, 2-methyl-pentene-1, 3-methyl-butene-1, etc., diolefins such as butadiene, isoprene, chloroprene, etc., styrene, etc. are mentioned. These olefins may be homopolymerized or copolymerized in combination with each other, for example, in combination of propylene with ethylene; butene with ethylene; and propylene with butene-1. In this case, they may be polymerized in admixture of monomers or in a plurality of steps where different α-olefins may be employed in the first step slurry or bulk polymerization and the second step gas phase polymerization.

The first effectiveness of the present invention is that a catalyst having a higher activity is obtained even in the case of gas phase polymerization having a lower monomer concentration than those in the case of slurry or bulk polymerization, and the yields of α-olefin polymers per g of the solid product amount to 7,000 to 11,000 g (polymer). It is thereby possible to further reduce the amount of catalyst used in the polymerization. Thus, even when the amount of alcohols, alkylene oxides, steam or the like employed in the catalyst killing or polymer purification carried out after production of α-olefin polymers are abbreviated, polymer is not colored and also no bad influences such as degradation of physical properties of polymer, rusting of mold at the time of polymer molding, etc. are observed. These effects can be exhibited even in the case of gas phase polymerization process; hence it is possible to abbreviate the purification process of polymer, reduce the cost required for polymer purification and hence the production cost of polymer.

The second effectiveness of the present invention is that the recovery and reuse of solvent or liquefied monomer employed in the case of gas phase polymerization, alone, can be entirely omitted or made minimum to thereby reduce the production cost of polymer; further, according to the slurry or bulk polymerization followed by gas phase polymerization, it is possible to reduce the concentration of monomer or liquefied α-olefin in the first stage slurry or bulk polymerization down to 30% or lower, and vaporize unreacted monomer by means of polymerization reaction heat in the following gas phase polymerization. Heretofore, particularly after bulk polymerization, it has been necessary for vaporizing, separating and recovering unreacted monomer to feed an amount of heat corresponding to its vaporization latent heat from the outside, but, according to the present invention, it is not only possible to omit application of such a heat from the outside or make the heat minimum, but the amount of monomer recovered is very small since the monomer conversion can be raised up to nearly 100%. Thus, the amount of solvent recovered and reused can be reduced as compared with that in the case of slurry polymerization, and besides, the monomer recovery cost can be reduced as compared with that in the case of slurry or bulk polymerization to thereby reduce the polymer production cost as compared with that in the case of slurry or bulk polymerization.

The third effectiveness of the present invention is that since the catalyst stability is notably improved, it is possible to carry out a stabilized polymer production. For example, when the solid product (II), (OAl) and (ED) in admixture are, as they are, allowed to stand in a catalyst tank or the like without preactivation with an α-olefin before polymerization reaction is carried out, then such drawbacks as notable reduction in the polymerization activity, notable reduction in the crystallinity of polymer, degradation in the powder form, etc. have been observed even one day later, but these drawbacks have been overcome according to the present invention. Further, reduction in the polymerization activity and reduction in the crystallinity of polymer which occur with the increase of time have become less; i.e. such a drawback has also been overcome. Furthermore, there has heretofore been observed a drawback in that the polymerization reaction is affected by the mixing manner of (OAl) with (ED) or a slight variance in the mixing conditions of (OAl), (ED) and the solid product (II), but such a drawback has also been overcome according to the present invention.

Due to the above-mentioned third effectiveness of the present invention, the effectiveness of the aforementioned fifth invention of the present inventors (Japanese patent application No. Sho 53-106,797 (1978)) referred to in the description of the prior art, such as higher crystallinity of polymer, higher yield of polymer, effective utilization of transition metal, capability of controlling the molecular weight distribution to a narrower one, good shape of polymer particles, etc. can be maintained as it is, without reduction, either even with the increase of time after the catalyst preparation or even with the increase of polymerization time. Such an effectiveness will be mentioned below in more detail.

Namely, the fourth effectiveness of the present invention is that a highly crystalline polymer is obtained in the production of α-olefin polymers. For example, in the production of propylene polymers, crystalline isotactic polypropylene as n-hexane insoluble amounts to 97%.

The fifth effectiveness of the present invention is that the transition metal contained in the catalyst employed is very effectively utilized; i.e. in usual propylene polymerization, the polymer yield amounts to $1 \times 10^4$ to $1 \times 10^6$ g (polymer)/g (transition metal atom).

The sixth effectiveness of the present invention is that it is possible to control the molecular weight distribution of the resulting α-olefin polymers to a narrower one even with the increase of time after the catalyst preparation; i.e. it is possible to control it to a value of 3.5 to 7.0 in terms of $M_w/M_n$.

The seventh effectiveness of the present invention is that polymer particles having a better shape are obtained; i.e. they have a bulk density (BD) of 0.40 to 0.50.

The present invention will be further illustrated by way of the following Examples.

EXAMPLE 1

(1) Preparation of solid product (II)

Aluminum trichloride (anhydrous) (130 g) was reacted with magnesium hydroxide (58 g) under milling by means of a vibration mill (having a capacity of 1000 ml and containing 50 balls of 1.25 mm in diameter) at 250° C. for 3 hours. Reaction took place with evolution of hydrogen chloride gas. After completion of the heating, the reaction product was cooled in nitrogen current to obtain 168 g of a solid product (I).

This solid product (I) (100 g), ethyl benzoate (22 g) and silicon tetrachloride (35 g) were introduced into the same vibration mill as above, and subjected to milling reaction at 40° C. for 5 hours. The reaction product thus obtained was suspended in 1,600 ml of titanium tetrachloride and then reacted together at 80° C. for 2 hours, followed by removing 1,000 ml of titanium tetrachloride containing soluble matters as they were; by decantation. Thereafter, 1,000 ml of titanium tetrachloride was further added, and reaction was carried out at 100° C. for 2 hours, followed by removing the supernatant liquid by decantation, repeating decantation four times, each time with 1,000 ml of n-hexane, filtering off in a dry box purged with nitrogen gas and drying under reduced pressure (−750 mmHg) for one hour to obtain a solid product (II). The Ti atom content in 1 g of this solid product (II) was 18 mg/g (solid product (II)).

(2) Preparation of preactivated catalyst

A 2 l capacity stainless steel reaction tube equipped with slant blades was purged with nitrogen gas and then 10 ml of n-hexane, 285 g of triethylaluminum and 18 mg of the solid product (II) were added. Propylene was fed at room temperature (20° C.), under a partial pressure of 1 kg/cm²G for 10 minutes (the amount of propylene polymerized was 0.9 of g/g of solid product (II)), followed by adding 67 mg of methyl p-toluylate to prepare a preactivated catalyst, which was then allowed to stand for 6 hours.

(3) Polymerization of propylene

Hydrogen (300 ml) was introduced into the reaction tube of the above item (2) containing the catalyst obtained above, and gas phase polymerization reaction was carried out under a partial pressure of propylene of 25 kg/cm²G at 70° C. for 2.5 hours. After completion of the reaction, 5 g of methanol was introduced to carry out killing reaction at 70° C. for 10 minutes, followed by cooling down to room temperature (20° C.) and drying the resulting polymer to obtain 216 g of a polymer of white powder. This polymer was washed three times with 500 ml of n-hexane at room temperature (20° C.) and divided into a n-hexane-insoluble polymer (at 20° C.) (isotactic polypropylene) and a n-hexane-soluble polymer (at 20° C.) (atactic polypropylene), followed by drying the respective polymers. The amounts of the isotactic polypropylene and atactic polypropylene were 207.3 g and 8.7 g, respectively. The polymer yield of the isotactic polypropylene per g the solid product (II) was 11,520 g. Its isotactic index was 96.0. (The isotactic index is expressed by the following formula:

$$\frac{\text{amount of isotactic polymer (g)}}{\text{amount of isotactic polymer (g)} + \text{amount of atactic polymer (g)}} \times 100$$

This applies to the succeeding isotactic indexes.)

This polymer had a bulk density (BD) of 0.44 and also a good particle shape close to sphere.

(4) Measurement of molecular weight distribution

Propylene polymer was dissolved in orthodichlorobenzene as solvent so as to give a concentration of 0.1 to 0.5%. The resulting solution was subjected to measurement of molecular weight distribution at 140° C. and at a flow rate of 1 ml/min., employing GPC 200 type manufactured by Waters Co. (This measurement applies to the succeeding ones.) The propylene polymer obtained in Example 1 had a $M_w/M_n$ of 4.7.

Comparative example 1

Example 1 was repeated except that, in the catalyst preparation, after triethylaluminum and the solid product (II) were added, methyl p-toluylate was added without feeding propylene.

EXAMPLE 2

Aluminum trichloride (anhydrous) (120 g) and magnesium oxide (40 g) were reacted together under milling in a vibration mill at 120° C. for 48 hours to obtain a solid product (I). This solid product (I) (20 g) and ethyl benzoate (6 g) were introduced into a ball mill (capacity: 785 ml) containing 80 balls of 10 mm in diameter and milled for 24 hours. Thereafter silicon tetrachloride (12 g) was fed and reaction was further carried out under milling for 48 hours. After completion of this milling reaction, the resulting material was suspended in TiCl₄ (300 ml) and reaction was carried out at 80° C. for 2 hours, followed by removing 200 ml of TiCl₄ by decantation, further adding 200 ml of TiCl₄, reacting at 60° C. for one hour, removing 200 ml of TiCl₄, repeating decantation 4 times each time with 200 ml of n-hexane, distilling off n-hexane under reduced pressure (−750 mmHg) at 35° C. for one hour to obtain a solid product (II). Employing this solid product (II), preparation of preactivated catalyst, still standing of the catalyst and propylene polymerization were carried out as in Example 1.

Comparative example 2

Example 2 was repeated except that propylene was not fed in the catalyst preparation.

EXAMPLE 3 n-Hexane (20 ml), triethylaluminum (218 mg), the solid product (II) obtained in Example 2 (18 mg) and ethyl anisate (25 mg) were mixed together, and propylene (0.5 g) was then fed at 40° C. to prepare a preactivated catalyst, which was then allowed to stand at room temperature (20° C.) for 24 hours with stirring, followed by propylene. polymerization as in Example 1.

Comparative example 3

Example 3 was repeated except that propylene was not fed in the catalyst preparation.

EXAMPLE 4 n-Hexane (12 ml), triethylaluminum (198 mg), the solid product (II) obtained in Example 2 (15 mg) and methyl p-toluylate (15 mg) were mixed together and propylene (0.8 g) was then fed, followed by stirring at room temperature (20° C.) for 10 minutes, and then adding ethyl p-toluylate (22 mg) to prepare a preactivated catalyst, which was then allowed to stand for 6 hours with stirring, followed by propylene polymerization as in Example 1.

Comparative example 4

Example 4 was repeated except that propylene was not fed in the catalyst preparation. (Stirring corresponding to the stirring after propylene feed carried out in Example 4 was carried out also in this Comparative example 4. This applies to the succeeding Comparative examples.)

EXAMPLE 5

The solid product (II) obtained in Example 2 (18 mg) was added to n-pentane (30 ml) and triethylaluminum (130 mg), and thereafter propylene (1.5 g) was added, followed by reacting at 40° C. for 10 minutes, and then adding ethyl benzoate (26 mg) and then propylene (0.5 g) to prepare a preactivated catalyst, which was then allowed to stand at room temperature (20° C.) for 48 hours with stirring, followed by propylene polymerization as in Example 1.

Comparative example 5

Example 5 was repeated except that propylene feed (twice) was not carried out in the catalyst preparation.

EXAMPLE 6

The solid product (II) obtained in Example 1 (20 mg) was added to n-pentane (5 ml) and triisobutylaluminum (280 mg), and thereafter hydrogen (180 ml) and ethylene (0.8 g) were added, followed by reacting at room temperature (20° C.) for 10 minutes, and then adding i-propyl benzoate (35 mg) to prepare a preactivated catalyst, which was then allowed to stand at room temperature (20° C.) for 48 hours with stirring, followed by propylene polymerization as in Example 1.

Comparative example 6

Example 6 was repeated except that hydrogen and ethylene were not added in the catalyst preparation.

EXAMPLE 7

The solid product (II) obtained in Example 2 (12 mg) was added to n-heptane (10 ml) and triethylaluminum (195 mg), and propylene was fed under a propylene partial pressure of 4 kg/cm$^2$G at 70° C. for 3 minutes (the amount of propylene polymerized: 0.52 g), followed by adding ethyl p-toluylate (28 mg) to prepare a preactivated catalyst, which was then allowed to stand at 30° C. for one hour with stirring, followed by propylene polymerization as in Example 1.

EXAMPLE 8

Aluminum trichloride (anhydrous) (60 g) and hydrotalcite ($Mg_6Al_2(OH)_{16}CO_3.4H_2O$) (20 g) were reacted on heating at 80° C. for 80 hours in a ball mill to obtain a solid product (I).

$TiCl_4$ (3 g) was added to this solid product (20 g) and they were reacted at 130° C. for 30 minutes in a ball mill, followed by removing unreacted $TiCl_4$ under reduced pressure, adding a complex of tetrahydrofuran with $TiCl_4$ (2:1) (2.5 g) and further reacting at 50° C. for 48 hours to obtain a solid product (II).

Employing this solid product (II), preparation of preactivated catalyst, standing and propylene polymerization were carried out as in Example 1.

Comparative example 7

Employing the solid product (II) obtained in Example 8, catalyst preparation, standing and propylene polymerization were carried out as in Comparative example 1.

EXAMPLE 9

Aluminum trichloride (anhydrous) (133 g) and magnesium carbonate (98 g) were subjected to milling reaction in a ball mill on heating at 180° C. for 48 hours to obtain a solid product (I). A complex of ethyl phenylacetate with $TiCl_4$ (1:1) (5 g) was added to the solid product (I) (20 g) and they were subjected to milling reaction in a ball mill at 30° C. for 72 hours to obtain a solid product (II).

Employing the solid product (II), catalyst preparation, standing and propylene polymerization were carried out as in Example 4.

EXAMPLE 10

The solid product (I) obtained in Example 9 (20 g) was suspended in toluene (100 ml), and methyl p-toluylate (12 g) was added, followed by reacting at 100° C. for 30 minutes, filtering off and drying to obtain a solid (20 g), which was then suspended in $TiCl_4$ (500 g), followed by reacting at 120° C. for one hour. After completion of the reaction, the resulting material was filtered off, washed three times each time with n-hexane (150 ml) and dried to obtain a solid product (II).

Employing this solid product, preactivated catalyst preparation, standing and propylene polymerization were carried out as in Example 1.

EXAMPLE 11

Ferric chloride (anhydrous) (120 g) and magnesium oxide (40 g) were subjected to milling reaction in a vibration mill at 120° C. for 48 hours to obtain a solid product (I). To this solid product (I) (20 g) were added anisole (10 g) and $TiCl_4$ (100 ml), and they were reacted at 160° C. for 2 hours, followed by filtering off, washing three times each time with n-hexane (150 ml) and drying to obtain a solid product (II).

Employing this solid product (II), preactivated catalyst preparation, standing and propylene polymerization were carried out as in Example 1.

EXAMPLE 12

The solid product (I) obtained in Example 2 (20 g), dimethylpolysiloxane (Toshiba Silicone Oil TSF-451, viscosity: 100 centistokes) (3 g) and ethyl benzoate (6.0 g) were subjected to milling reaction in a ball mill for 48 hours, and the resulting material was suspended in $TiCl_4$ (400 ml), followed by reacting at 130° C. for one hour, thereafter still standing, removing the supernatant liquid (300 ml) containing $TiCl_4$, adding toluene (300 ml), stirring at 100° C. for 2 hours, removing the supernatant liquid by decantation, washing three times each time with 250 ml of n-hexane and drying to obtain a solid product (II).

Employing this solid product (II), preactivated catalyst preparation, standing and propylene polymerization were carried out as in Example 1.

EXAMPLE 13

Ferric chloride (anhydrous) (60 g) and aluminum-magnesium oxide (MgAl$_2$O$_4$) (70 g) were reacted together in a vibration mill at 320° C. for 5 hours to obtain a solid product (I).

This solid product (I) (20 g) was suspended in toluene (180 ml), and ethanol (10 g) was added, followed by reacting at 30° C. for one hour, twice repeating a procedure of toluene addition (150 ml) and decantation, making the total amount 180 ml, adding benzophenone (8 g), reacting at 60° C. for 30 minutes, decanting, adding toluene (150 ml), decanting, making the total amount 60 ml, adding TiCl$_4$ (170 g) and di-n-butyl ether (20 ml) and reacting at 130° C. for one hour to obtain a solid product (II).

Employing this solid product (II), preactivated catalyst preparation, standing and propylene polymerization were carried out as in Example 5.

EXAMPLE 14

Aluminum trichloride (anhydrous) (60 g) and hydromagnesite (3MgCO$_3$.Mg(OH)$_2$.3H$_2$O) (65 g) were heated at 100° C. for 2 hours. The resulting material (40 g) was subjected to milling reaction in a vibration mill at 250° C. for one hour to obtain a solid product (I).

Into n-hexane (200 ml) were introduced methylhydrogenpolysiloxane (Toshiba Silicone Oil TSF-484, viscosity: 16 centistokes) (20 ml) and the above solid product (I) (50 g), and they were reacted at 40° C. for one hour, followed by filtering off, washing with n-hexane and drying. To the resulting dried solid (20 g) were added methyl toluylate (2 g) and TiCl$_4$ (6 g), and they were subjected to milling reaction in a ball mill at 80° C. for 20 hours, followed by removing unreacted substances under reduced pressure at 80° C. 2 hours to obtain a solid product (II).

Employing this solid product (II) (20 mg), preactivated catalyst preparation, standing and propylene polymerization were carried out as in Example 6.

EXAMPLE 15

Example 1 was repeated except that the product obtained in Example 12 (18 mg) was employed as the solid product (II) and diethylene glycol dimethyl ether (18 mg) was substituted for methyl p-toluylate.

The results of Examples 1 to 15 and Comparative examples 1 to 7 are shown in Table 1.

EXAMPLE 16

The solid product (II) obtained in Example 2 (12 mg) was added to triisobutylaluminum (430 mg), and propylene (0.8 g) was then added, followed by standing at room temperature for 10 minutes and adding anisole (18 mg) to prepare a preactivated catalyst, which was then allowed to stand at room temperature for 6 hours with stirring, followed by ethylene polymerization under a hydrogen partial pressure of 6 kg/cm$^2$G and an ethylene partial pressure of 7 kg/cm$^2$G at 85° C. for 5 hours.

Comparative example 8

Example 16 was repeated except that propylene was not added in the catalyst preparation.

EXAMPLE 17 n-Hexane (20 ml), triethylaluminum (380 mg), dimethylpolysiloxane (10 mg) and the solid product (II) obtained in Example 13 (8 mg) were mixed together, and butene-1 (2.4 g) was then added to prepare a preactivated catalyst, which was then allowed to stand at room temperature for 30 minutes, followed by ethylene polymerization as in Example 16.

EXAMPLE 18 n-Hexane (10 ml), triethylaluminum (195 mg) and the solid product (II) obtained in Example 2 (12 mg) were mixed together, and hydrogen (80 ml) and propylene (0.8 g) were then added, followed by stirring at room temperature (25° C.) for 10 minutes, adding methyl p-toluylate (25 mg) and further adding propylene (0.3 g) to prepare a preactivated catalyst, which was then allowed to stand at room temperature (25° C.) for 30 minutes with stirring, followed by carrying out polymerization reaction under a propylene partial pressure of 10 kg/cm$^2$G at a polymerization temperature of 60° C. for 4 hours, while feeding ethylene 8 times at 30 minutes intervals, each time in an amount of 10 g. After completion of the reaction, a propylene-ethylene copolymer was obtained as in Example 1.

Comparative example 9

Example 18 was repeated except that hydrogen and propylene were not added and also propylene was not added in the catalyst preparation.

EXAMPLE 19

Example 18 was repeated except that butene 1 was substituted for ethylene as a comonomer to carry out propylene-butene-1 copolymerization.

EXAMPLE 20

To the solid product (I) obtained in Example 2 (20 g) were added cumyl alcohol (2 g) and ethyl benzoate (5 g), and they were subjected to milling reaction in a ball mill at 30° C. for 24 hours, followed by adding silicon tetrachloride (9 g) and further subjecting to milling reaction for 48 hours. The resulting solid (20 g) was suspended in TiCl$_4$ (200 g), followed by reacting at 80° C. for 4 hours, removing the supernatant liquid by decantation, washing three times each time with 150 ml of trichloroethylene and drying to obtain a solid product (II).

Employing this solid product (II), preactivated catalyst preparation, standing and propylene-butene-1 copolymerization were carried out as in Example 18.

EXAMPLE 21

Aluminum trichloride (anhydrous) (133 g) and magnesium oxide (40 g) were milled in the same mill as that employed in Example 2, for 24 hours, followed by heating at 120° C. for 2 hours, cooling and further milling for 10 hours to obtain a solid product (I).

A reaction product obtained in advance by mixing and reacting ethyl benzoate (12 g) with silicon tetrachloride (4.5 g) at room temperature (20° C.), and the reaction product (I) (40 g) were subjected to milling reaction in a ball mill at 35° C. for 48 hours. The resulting powder (20 g) was suspended in TiCl$_4$ (180 g) and they were reacted at 80° C. for 2 hours, followed by removing the supernatant liquid by decantation, further adding TiCl$_4$ (180 g), reacting at 80° C. for one hour, removing the supernatant liquid by decantation, twice repeating a procedure of adding n-hexane (150 ml) and removing by decantation, filtering off and drying in a dry box to obtain a solid product (II). The Ti atom content in 1 g of this solid product (II) was 19 mg.

This solid product (II) (13 mg) and triethylaluminum (220 mg) were added to n-hexane (20 ml) contained in the same reaction tube as that employed in Example 1, item (2), and propylene was fed under a propylene partial pressure of 1 kg/cm$^2$G at 20° C. for 30 minutes (propylene fed: 0.6 g), followed by adding methyl p-toluylate (60 mg) and standing at 20° C. for 24 hours with stirring to prepare a preactivated catalyst, introducing hydrogen (300 ml) and propylene (300 g) into this reaction tube and carrying out bulk polymerization under a propylene partial pressure of 32 kg/cm$^2$G at 70° C. for 30 minutes to polymerize propylene (40 g). Gas phase polymerization was then carried out for 3 hours while the unreacted propylene-containing slurry inside the reaction tube was flushed into a reactor of 20 cm in diameter and 20 l in capacity, equipped with stirring blades, wherein a fluidized bed was formed by circulating propylene at a flow rate of 5 cm/sec. under a propylene partial pressure of 21 kg/cm$^2$G (the partial pressure being maintained by feeding fresh propylene since the pressure was reduced with the advance of the polymerization), at a reaction temperature of 70° C. to fluidize polymer. After completion of the reaction, post-treatment was carried out as in Example 1 to obtain polymer.

EXAMPLE 22

The preactivated catalyst obtained in Example 21 was added to n-hexane (100 ml) contained in a 2 l capacity stainless steel reactor, and further hydrogen (240 ml) was added, followed by polymerization under a propylene partial pressure of 18 kg/cm$^2$G at 68° C. In this case, the initial polymerization was slurry one and 30 minutes later, a state wherein solvent was occluded in polymer particles was brought about; i.e. the slurry polymerization transferred to gas phase polymerization, which was further carried out for 1.5 hour.

EXAMPLE 23

Polypropylene powder (5 g) obtained by sieving with Tyler standard sieves of 80–120 meshes was introduced into a 3 l capacity stainless steel reactor, and further, triethylaluminum (456 mg), methyl p-toluylate (30 mg) and the solid product (II) (25 mg) obtained in Example 21 were introduced within one minute, followed by feeding propylene under a partial pressure of 3 kg/cm$^2$G at 28° C. for 5 minutes and then adding methyl p-toluylate (78 mg) to prepare a preactivated catalyst. Hydrogen (150 ml) was then added to the reactor, followed by gas phase polymerization reaction under a propylene partial pressure of 26 kg/cm$^2$G at 70° C. for 5 hours. After completion of the polymerization reaction, methanol (50 ml) was introduced into the reactor to terminate the polymerization reaction, followed by pouring the contents into a Buchner funnel, filtering off and drying to obtain 300 g of polypropylene. The polymer yield per g of the solid product (II) was 12,000 g; the polymer yield per g of Ti atom, $6.3 \times 10^5$ g; the isotactic index, 96.5; MFR, 6.3; and $M_w/M_n$, 4.8. The results of Examples 16 to 23 and Comparative examples 8 and 9 are shown in Table 2.

TABLE 1

| Nos. of Examples and Comparative examples | Ti atom content in solid product (II) (mg/g) | Polymer yield (g) Isotactic polymer per g of solid product (II) | Polymer yield (g) Per g of Ti atom | Isotactic index | BD | $\overline{M_w}/\overline{M_n}$ | *MFR | 4 meshes on (%) |
|---|---|---|---|---|---|---|---|---|
| Ex. 1 | 18.0 | 11,520 | $6.4 \times 10^5$ | 96.0 | 0.44 | 4.7 | 4.8 | 0 |
| Comp. ex. 1 | 18.0 | 2,200 | $1.2 \times 10^5$ | 84.5 | 0.30 | 8.6 | 4.2 | 12 |
| Ex. 2 | 30.5 | 12,960 | $4.2 \times 10^5$ | 96.6 | 0.43 | 4.6 | 5.8 | 0 |
| Comp. ex. 2 | 30.5 | 2,800 | $0.9 \times 10^5$ | 90.1 | 0.31 | 8.2 | 4.8 | 8 |
| Ex. 3 | 30.5 | 7,400 | $2.4 \times 10^5$ | 96.2 | 0.41 | 4.6 | 6.2 | 0 |
| Comp. ex. 3 | 30.5 | 2,200 | $0.7 \times 10^5$ | 89.8 | 0.32 | 7.8 | 4.6 | 4 |
| Ex. 4 | 30.5 | 12,000 | $3.9 \times 10^5$ | 96.9 | 0.45 | 4.8 | 6.1 | 0 |
| Comp. ex. 4 | 30.5 | 2,100 | $0.7 \times 10^5$ | 91.2 | 0.32 | 7.0 | 5.2 | 18 |
| Ex. 5 | 30.5 | 12,800 | $4.2 \times 10^5$ | 96.6 | 0.45 | 4.8 | 6.2 | 0 |
| Comp. ex. 5 | 30.5 | 1,800 | $0.6 \times 10^5$ | 88.2 | 0.30 | 7.6 | 6.1 | 22 |
| Ex. 6 | 18.0 | 11,400 | $6.3 \times 10^5$ | 96.4 | 0.42 | 4.9 | 4.8 | 0 |
| Comp. ex. 6 | 18.0 | 3,200 | $1.8 \times 10^5$ | 90.5 | 0.32 | 7.1 | 4.3 | 12 |
| Ex. 7 | 30.5 | 12,200 | $4.0 \times 10^5$ | 96.8 | 0.46 | 4.2 | 4.1 | 0 |
| Ex. 8 | 35.0 | 10,100 | $2.9 \times 10^5$ | 92.0 | 0.41 | 4.2 | 5.6 | 0 |
| Comp. ex. 7 | 35.0 | 1,400 | $0.4 \times 10^5$ | 85.2 | 0.22 | 7.6 | 5.1 | 14 |
| Ex. 9 | 27.0 | 10,000 | $3.7 \times 10^5$ | 93.8 | 0.40 | 4.5 | 5.2 | 0 |
| Ex. 10 | 30.2 | 10,000 | $3.3 \times 10^5$ | 94.8 | 0.40 | 5.1 | 5.2 | 0 |
| Ex. 11 | 35.0 | 7,600 | $2.2 \times 10^5$ | 92.1 | 0.40 | 4.8 | 5.1 | 0 |
| Ex. 12 | 30.1 | 9,200 | $3.1 \times 10^5$ | 95.0 | 0.43 | 4.6 | 6.2 | 0 |
| Ex. 13 | 22.3 | 6,800 | $3.0 \times 10^5$ | 90.2 | 0.40 | 5.0 | 4.2 | 0 |
| Ex. 14 | 29.4 | 10,400 | $3.5 \times 10^5$ | 94.0 | 0.41 | 5.0 | 7.1 | 0 |
| Ex. 15 | 30.1 | 10,800 | $3.6 \times 10^5$ | 94.0 | 0.41 | 4.4 | 6.5 | 0 |

*Melt flow rate (according to ASTM D-1233 (L))

TABLE 2

| Nos. of Examples and Comparative examples | Ti atom content in solid product (II) (mg/g) | Polymer yield (g) Isotactic polymer per g of solid product (II) | Polymer yield (g) Per g of Ti atom | Isotactic index | BD | $\overline{M_w}/\overline{M_n}$ | *MFR | 4 meshes on (%) |
|---|---|---|---|---|---|---|---|---|
| Ex. 16 | 30.5 | 12,200 | $4.0 \times 10^5$ | — | 0.40 | 4.6 | 5.2 | 0 |
| Comp. ex. 8 | 30.5 | 2,200 | $0.7 \times 10^5$ | — | 0.30 | 7.5 | 5.4 | 10 |
| Ex. 17 | 30.1 | 12,100 | $4.0 \times 10^5$ | — | 0.40 | 4.2 | 5.8 | 0 |
| Ex. 18 | 30.5 | 12,200 | $4.0 \times 10^5$ | 94.0 | 0.40 | 4.8 | 5.2 | 0 |
| Comp. ex. 9 | 30.5 | 3,100 | $1.0 \times 10^5$ | 89.8 | 0.30 | 7.9 | 4.3 | 11 |
| Ex. 19 | 30.5 | 12,100 | $4.0 \times 10^5$ | 95.0 | 0.40 | 5.0 | 4.2 | 0 |
| Ex. 20 | 42.1 | 11,400 | $2.7 \times 10^5$ | 96.0 | 0.42 | 4.8 | 5.4 | 0 |
| Ex. 21 | 19.0 | 12,600 | $6.6 \times 10^5$ | 96.5 | 0.42 | 4.5 | 5.2 | 0 |
| Ex. 22 | 19.0 | 11,400 | $6.0 \times 10^5$ | 96.6 | 0.41 | 4.3 | 5.1 | 0 |
| Ex. 23 | 19.0 | 12,000 | $6.3 \times 10^5$ | 96.5 | 0.44 | 4.8 | 6.3 | 0 |

*Melt flow rate (according to ASTM D-1238 (L))

What is claimed is:

1. A process for producing α-olefin polymers which comprises:
   milling (A) a trivalent metal halide selected from the group consisting of aluminum trichloride (anhydrous), ferric chloride (anhydrous) and aluminum tribromide (anhydrous), together with
   (B) a divalent metal compound selected from the group consisting of
   Mg(OH)$_2$, Ca(OH)$_2$, Zn(OH)$_2$, Mn(OH)$_2$, MgO, CaO, ZnO, MnO, MgAl$_2$O$_4$, Mg$_2$SiO$_4$, Mg$_6$MnO$_8$, MgCO$_3$, MnCO$_3$, MgCO$_3$·CaCO$_3$, SnCl$_2$·2H$_2$O, MgCl$_2$·nH$_2$O (n=1~6), NiCl$_2$·6H$_2$O, MnCl$_2$·4H$_2$O, KMgCl$_3$·6H$_2$O, MgCl$_2$·nMg(OH)$_2$·mH$_2$O (n=1~3, m=1~6), 3MgO·2SiO$_2$·2H$_2$O, 3MgCO$_3$·Mg(OH)$_2$·3H$_2$O and Mg$_6$Al$_2$(OH)$_{14}$CO$_3$·4H$_2$O,
   in a proportion of 0.1 to 20 mols of (B) to one mol of (A), and
   reacting the resulting mixture of (A) with (B) at a temperature of room temperature (20° C.) to 500° C.,
   to obtain a solid product (I);
   reacting with this solid product (I),
   (ED) an electron donor selected from the group consisting of alcohols, ethers, esters, aldehydes, fatty acids, ketones, nitriles, amines, amides, urea, thiourea, isocyanates, azo compounds, phosphines, phosphites, phosphinites, thioethers, thioalcohols and polysiloxanes, and
   (EA) an electron acceptor selected from the group consisting of (EA$_1$) aluminum chloride compounds expressed by the formula R$_n$AlCl$_{3-n}$ (wherein 0≦n<3 and R is a hydrocarbon radical of 1 to 20 carbon atoms), and (EA$_2$) inorganic chlorides consisting of the group of SiCl$_4$, SnCl$_2$, SnCl$_4$, TiCl$_4$, ZrCl$_4$, PCl$_3$, VCl$_4$, SbCl$_5$, SCl$_2$, MnCl$_2$, FeCl$_2$ and NiCl$_2$,
   at a reaction temperature of 0° to 500° C.,
   (ED) and (EA) being respectively reacted one to 10 times,
   TiCl$_4$ being employed as said electron acceptor at least once, and
   (ED) and (EA) being respectively employed in an amount of 5 to 50 parts by weight each time, based on 100 parts by weight of said solid product (I), to obtain a solid product (II);
   combining with one part by weight of this solid product (II),
   0.1 to 500 parts by weight of (OAl) an organoaluminum compound, and
   0.05 to 20 parts by weight of (ED) an electron donor, and
   at the time of this combination, reacting 0.05 to 300 parts by weight based on one part by weight of said solid product (II), of (α-O) an α-olefin, with a combination of said solid product (II) and said (OAl) or a combination of said solid product (II), said (OAl) and said (ED), at a temperature of 0° to 100° C. for a period of one minute to 20 hours,
   to obtain a preactivated catalyst; and
   polymerizing an α-olefin or α-olefins in the presence of this catalyst.

2. A process according to claim 1 wherein TiCl$_4$ alone is employed as said (EA).

3. A process according to claim 1 wherein said TiCl$_4$ is employed as said electron acceptor only once.

4. A process according to claim 3 wherein at least one member selected from the groups consisting of said (EA$_1$) and (EA$_2$) is employed as an electron acceptor or electron acceptors other than TiCl$_4$.

5. A process according to claim 3 wherein at least one member selected from the group of said (EA$_1$) and at least one member selected from the group consisting of SiCl$_4$, SnCl$_2$, SnCl$_4$, ZrCl$_4$, PCl$_3$, VCl$_4$, SbCl$_5$, SCl$_2$, MnCl$_2$, FeCl$_2$ and NiCl$_2$ are employed as electron acceptors other than TiCl$_4$.

6. A process according to claim 1 wherein at least one member selected from the group consisting of AlCl$_3$, C$_2$H$_5$AlCl$_2$, C$_3$H$_7$AlCl$_2$, n-C$_4$H$_9$AlCl$_2$, i-C$_4$H$_7$AlCl$_2$, (C$_2$H$_5$)$_{1.5}$AlCl$_{1.5}$, (C$_2$H$_5$)$_2$AlCl, (n-C$_3$H$_7$)$_2$AlCl and (i-C$_4$H$_7$)$_2$AlCl is employed as said (EA$_1$).

7. A process according to claim 1 wherein at least one member selected from the group consisting of SiCl$_4$, SnCl$_2$, SnCl$_4$, ZrCl$_4$, PCl$_3$, PCl$_5$, VCl$_4$, SbCl$_5$, SCl$_2$, MnCl$_2$, FeCl$_2$ and NiCl$_2$ is employed as said (EA$_2$).

8. A process according to claim 1 wherein said polymerization of an α-olefin or α-olefins is carried out by bulk polymerization followed by gas phase polymerization.

9. A process according to claim 1 wherein said polymerization of an α-olefin or α-olefins is carried out by slurry polymerization followed by gas phase polymerization.

10. A process according to claim 1 wherein at least one member selected from the group consisting of (CH$_3$)$_3$Al, (C$_2$H$_5$)$_3$Al, (n-C$_3$H$_7$)$_3$Al, (n-C$_4$H$_9$)$_3$Al, (i-C$_4$H$_9$)$_3$Al, (n-C$_6$H$_{13}$)$_3$Al, (i-C$_6$H$_{13}$)$_3$Al, [CH$_2$CH(CH$_3$)(CH$_2$)$_2$CH$_3$]$_3$Al, (n-C$_8$H$_{17}$)$_3$Al, (n-C$_{10}$H$_{21}$)$_3$Al, (C$_2$H$_5$)$_2$AlCl, (C$_3$H$_7$)$_2$AlCl, (i-C$_4$H$_9$)$_2$AlCl, (C$_2$H$_5$)$_2$AlF, (C$_2$H$_5$)$_2$AlBr, (C$_2$H$_5$)$_2$AlI, (C$_2$H$_5$)AlCl$_2$, (i-C$_4$H$_9$)AlCl$_2$, (C$_2$H$_5$)$_2$AlH, (CH$_3$)$_{1.5}$AlCl$_{1.5}$, (C$_2$H$_5$)$_{1.5}$AlCl$_{1.5}$, (C$_2$H$_5$O)Al(C$_2$H$_5$)$_2$ and (C$_2$H$_5$O)$_2$Al(C$_2$H$_5$) is employed as said (OAl).

* * * * *